United States Patent [19]

Klotz, Jr.

[11] Patent Number: 5,040,860
[45] Date of Patent: Aug. 20, 1991

[54] MOMENTUM-BALANCE MECHANISM FOR USE WITH A SCAN MIRROR OR OTHER COMPONENT

[75] Inventor: Paul R. Klotz, Jr., Harvard, Mass.
[73] Assignee: Litton Systems, Inc., Lexington, Mass.
[21] Appl. No.: 574,840
[22] Filed: Aug. 29, 1990
[51] Int. Cl.[5] ............................................. G02B 26/08
[52] U.S. Cl. ................................... 359/198; 359/876; 359/223
[58] Field of Search ................. 350/6.1, 6.6, 600, 636, 350/486, 487

[56] References Cited

U.S. PATENT DOCUMENTS

| | | | |
|---|---|---|---|
| 4,100,576 | 7/1978 | Ditthardt | 350/486 |
| 4,270,048 | 5/1981 | Liebing | 350/6.6 |
| 4,376,572 | 3/1983 | Gijzen | 350/486 |
| 4,660,941 | 4/1987 | Hattori et al. | 350/487 |
| 4,705,365 | 11/1987 | Wakita et al. | 350/487 |

Primary Examiner—Loha Ben
Attorney, Agent, or Firm—Michael H. Wallach; Robert F. Rotella

[57] ABSTRACT

A momentum balance-mechanism is disclosed in which a mirror or other object which must be rapidly dithered around tip and tilt axes is supported above a base. The momentum balance-mechanism permits rapid dithering of the mirror or other mechanism while minimizing the reaction forces generated by rotation of the mirror or other object. The mirror which is subject to being dithered and a balance weight are independently supported to permit each to rotate about a common center in opposite directions to achieve a momentum-balanced scanning system. The mirror and balance weight are independently supported by two concentrically-located tripods which terminate in a common support base at one end and in two interface fittings at the other end. One of the interface fittings supports the mirror while the other interface fitting supports the balance weight. The mirror and the balance weight rotate about the virtual intersection of the two sets of tripod legs.

10 Claims, 2 Drawing Sheets

MOMENTUM-BALANCE MECHANISM FOR USE WITH A SCAN MIRROR OR OTHER COMPONENT

BACKGROUND OF THE INVENTION

1. Field of the Invention

This invention relates to optical systems in general, and more particularly to the momentum-balance mechanism for use with a scan mirror in an optical system.

2. Summary of the Prior Art

Prior known support systems for scan mirrors were deficient in that rapid motion of the mirror about the tip and tilt axes produced reaction forces which were transmitted through the mirror's support mechanism into the structure supporting the scanning mirror. For example, in light weight vehicles, these reaction forces can contribute to heading and pointing errors in aligning the vehicle with a target to be viewed.

SUMMARY OF THE INVENTION

A principal object of this invention is to provide a rugged, stable, mounting system which will permit a mirror or other mounted device and a balance weight to rotate about a common center in a momentum-balanced configuration, to eliminate reaction forces in the mount. Another object of this invention is to provide a mounting system which will permit a mirror or other mounted device to be rapidly moved in tip and tilt motions while accurately determining the location of the mirror or mounted device with respect to the support structure. Still another object of this invention is to provide a mounting system in which the mounted device can be locked into position during movement and/or rapid accelerations of the platform on which the mechanism is fastened.

The foregoing and other objects and advantages of the invention are achieved by utilizing a tripod support system in which a first of two concentrically arranged tripods is used to support a mirror or other device and a second, concentrically located tripod used to support a momentum-balance weight. The mirror and momentum-balance weight are each free to rotate about a common center in opposite directions to achieve a momentum-balanced scanning system. The momentum balance mechanism includes a tripod flexure for supporting a momentum-balance weight above a base or supporting structure, and a second, concentrically located tripod flexure for supporting the mirror above the momentum-balance weight. Neither of the tripods nor the mirror or the momentum-balance weight contact each other, thereby allowing independent motion of the mirror and the momentum-balance weight with respect to each other and the support base.

BRIEF DESCRIPTION OF THE DRAWINGS

The above-objects and other advantages of the invention will be appreciated after review of the detailed description of a preferred embodiment when read in conjunction with the drawing in which.

DETAILED DESCRIPTION OF A PREFERRED EMBODIMENT

Figure 1:
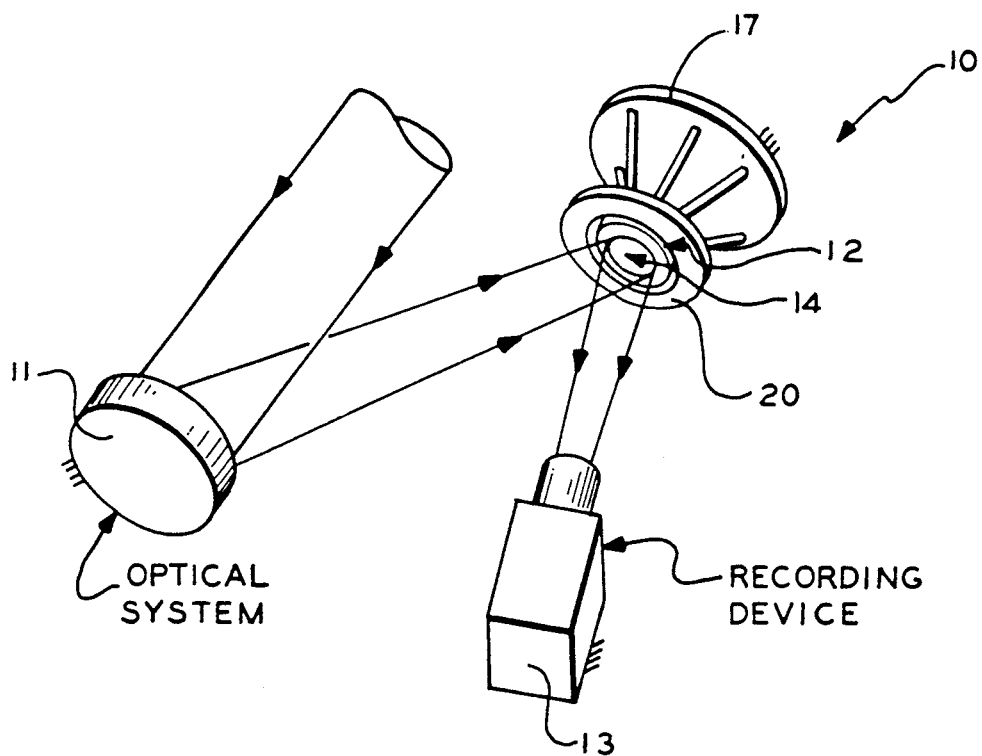
FIG. 1 is a perspective view of a system in which a scan mirror incorporating the teachings of the present invention is used to scan an image field onto a recording device.

Referring to the drawing, FIG. 1 shows a preferred embodiment of a mirror/momentum-balance mechanism constructed in accordance with the teachings of the disclosed invention. The momentum-balance mechanism 10 is used to support a mirror 12 having a reflecting surface 14 which must be rapidly dithered to scan a field of view for presentation to other components of an optical system, for example to image a scene from the optical system 11 onto the recording device 13.

Figure 2:
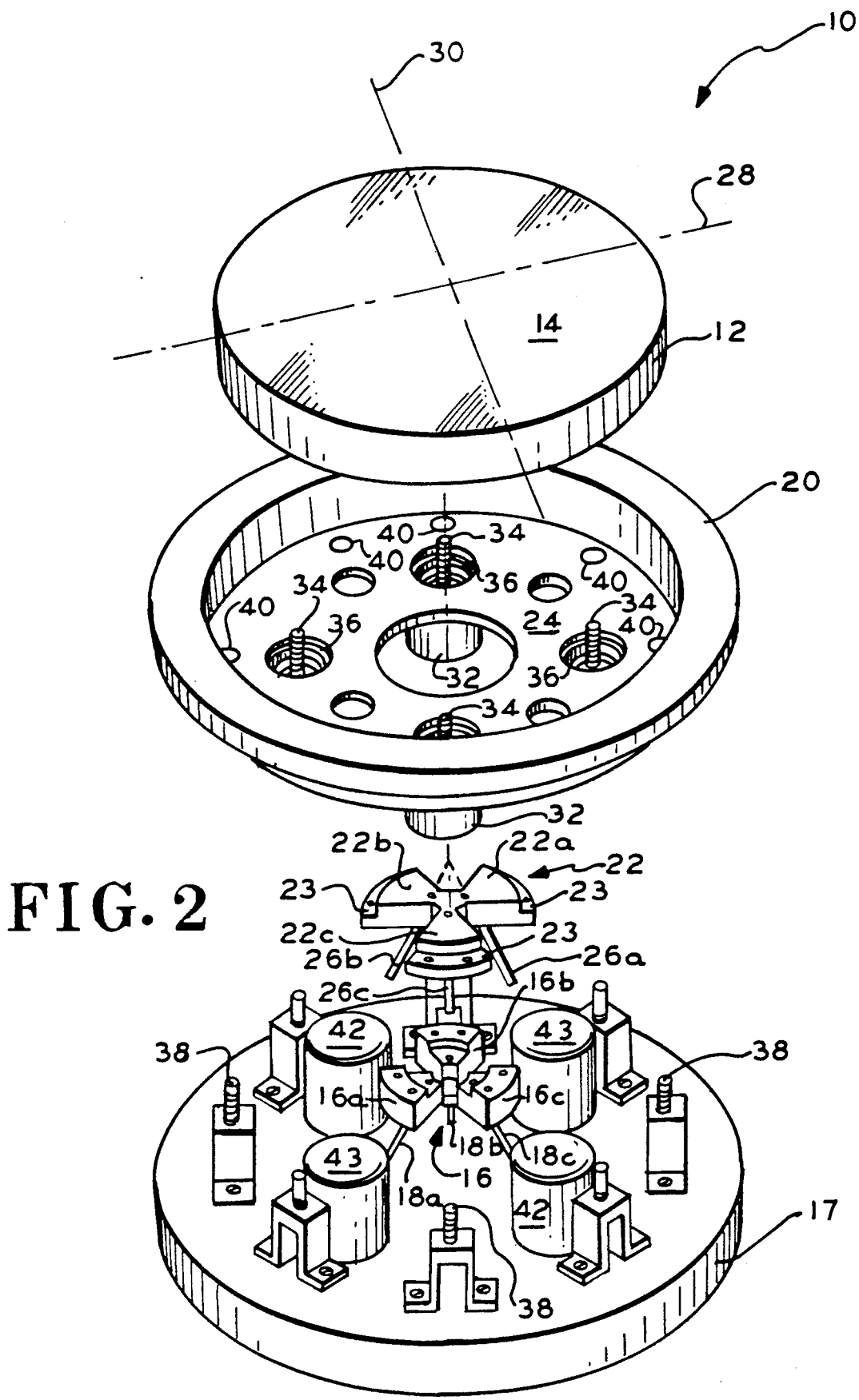
FIG. 2 is a partially disassembled perspective view showing a momentum-balance mechanism for use with a scan mirror.

Referring now to FIG. 2, the mirror 12 is supported on the three arms 16a, 16b and 16c of the mirror tripod flexure fitting 16 by fastening the mirror tripod flexure fitting 16 to the rear surface of the mirror using, for example, a threaded device or an epoxy bond. The mirror tripod flexure fitting 16 is supported above the support structure 17 by three legs 18a, 18b, and 18c which are fastened to structure 17.

The momentum-balance plate 20 is supported above the support structure or base 17 by a momentum-balance tripod flexure shown generally at 22 which contain arms 22a, 22b and 22c. The mirror tripod flexure fitting 16 is constructed with complementary arms 16a, 16b and 16c which fit between arms 22a, 22b and 22c of the momentum-balance tripod flexure 22. Each arm 22a, 22b and 22c of the momentum-balance tripod flexure 22 includes a supporting lip 23 which engages the base 24 of the momentum-balance plate 20 to support the balance plate above the base 17.

The rear surface of the momentum-balance plate 20 is supported on the three arms 22a, 22b and 22c of the momentum-balance tripod flexure 22 by fastening the tripod flexure 22 to the rear surface of the momentum-balance plate 20 using screws or an epoxy. Tripod flexure 22 is supported above the support structure 17 by three tripod legs 26a, 26b and 26c.

Tripod legs 18a, 18b and 18c are concentric to tripod legs 26a, 26b and 26c, and intersect at the same virtual point, thereby providing a common center of rotation for the mirror 12 and momentum-balance plate 20. Legs 18a, 18b and 18c of the mirror flexure tripod are identical in section size and length with legs 26a, 26b and 26c of the momentum-balance flexure tripod to provide equal flexural stiffness for different orientations of the tip and tilt axes of the mirror 12 and momentum-balance plate 20. In addition, the virtual intersection point for legs 26a, 26b and 26c is identical to the intersection point of legs 18a, 18b and 18c. Ideally, for a scan mirror, the virtual point of intersection of the two sets of legs should occur at the reflecting (or front) surface 14 of the mirror 12. The virtual point of intersection can be changed, if desired, to have the mirror 12 and momentum-balance plate 20 rotate about another axis, e.g., through the center of the mirror.

The mirror 12 and momentum-balance plate 20 are driven about the tip axis 28 and tilt axis 30 by four moving-magnet actuators 32, each of which contains a shaft 34 which is fastened to the mirror 12 and a housing which is fastened to the momentum-balance plate 20. Each moving magnet actuator housing is suspended from the momentum-balance plate 20, and the shaft 34 thereof is fastened to the mirror 12 through apertures 36 contained in the base 24 of the momentum-balance plate 20 to permit motion of the mirror 12 relative to the balance plate 20.

Four electro-conductive sensors 38 are located around the periphery of the support structure 17 to provide information on the orientation of the mirror 12 with respect to the support structure 17. Each sensor 38 is positioned through a corresponding aperture 40 in the base 24 of momentum-balance plate 20, and provides an electrical output which is proportional to the distance between the rear surface of the mirror 12 and the top of the electro-conductive sensor 38. This information may be used by control electronics (not shown) in a servo-loop control system to provide feedback to each of the moving-magnet actuators 32 to permit control of the tip and tilt orientation of the mirror 12. The base 17 also contains two mirror caging latches 42 which permit locking of the mirror at times when tip and tilt of the mirror are to be prevented, and two momentum-balance plate caging latches 43 to prevent motion of the balance plate 20 during such times as it is desired to prevent tip and tilt of the balance plate. Latches 42 and 43 are electromagnetic mechanisms which may be energized to lock the mirror 12 and momentum-balance plate 20 at such times as it is desired to prevent motion of the mirror and balance plate around the tip and tilt axes.

The momentum-balance mechanism disclosed herein provides for independent support of the momentum-balance plate 20 and the scanning mirror 12, thereby permitting each to freely rotate about a common center in opposite directions to achieve a momentum-balance scanning system. Since both the mirror 12 and the balance plate 20 rotate about a common center in a momentum-balanced configuration, reaction forces or couple moments are eliminated, thereby achieving a momentum-balance system. Sufficient distance is maintained between the bottom of mirror 12 and the base 24 of momentum-balance plate 20 to insure that there is adequate clearance between the mirror 12 and balance plate 20 so that they can tip and tilt in opposite directions without contacting each other to insure that the desired momentum-balance is maintained. Both the mirror 12 and momentum-balance plate 20 rotate about the virtual intersection of the respective tripod legs 26a, 26b and 26c and 18a, 18b and 18c, thereby permitting a momentum-balance configuration to be maintained between the mirror 12 and the balance plate 20.

While the foregoing invention has been described in conjunction with a scan mirror for use in an optical system, it will be obvious to one skilled in the art that the disclosed mechanism will have many applications in which a rugged, stable mounting system is required to permit rapid dithering of an element while eliminating any reaction forces and/or couples in the mounting arrangement, for example, in systems having electro-optic sensors such as star sensors. While a preferred embodiment has been described herein, it is to be understood that the teachings and disclosure of the present invention will suggest other embodiments and variations to those skilled in the art. It is intended that all such embodiments and variations be only limited by the permissible scope of interpretation of the claims appended hereto.

I claim:

1. A momentum-balance mechanism for supporting a scan mirror while permitting rotations around tip and tilt axes of the scan mirror, said momentum-balance mechanism being comprised of:

a. a base structure;
   b. means for supporting the mirror above said base structure, said means for supporting the mirror permitting limited rotation of the mirror around the mirror's tip and tilt axes;
   c. a momentum-balance plate for counteracting momentum forces generated by motion of the mirror around the tip and tilt axes of the mirror;
   d. means fastened to said base structure by a tripod having three legs of equal length and stiffness for supporting said momentum-balance plate above said base structure; and
   e. means on said momentum-balance plate for rotating the mirror around the mirror's tip and tilt axes; whereby the momentum forces generated by the motion of the mirror are balanced by counteracting momentum forces generated by motion of said momentum-balance plate, thereby reducing the reaction forces generated by the motion of the mirror.

2. The momentum-balance mechanism of claim 1, wherein said means for supporting the mirror is fastened to said base structure by a tripod having three legs of equal length and stiffness.

3. The momentum-balance mechanism of claim 2, wherein said means for supporting said momentum-balance plate contains apertures spaced around the circumference of said means for supporting said momentum-balance plate and said means for supporting the mirror has complementary segments around its circumference which extend through the apertures in said means for supporting said momentum-balance plate to support the mirror above said momentum-balance plate while permitting rotation of the mirror around the mirror's tip and tilt axes independent of the motion of said momentum-balance plate.

4. The momentum-balance mechanism of claim 3, wherein two or more position sensors are positioned in proximity to said momentum-balance plate and also in proximity to the mirror to sense the location of said momentum-balance plate and the mirror with respect to said base structure.

5. The momentum-balance mechanism of claim 4, wherein said position sensors provide control signals to said means for rotating the mirror around the mirror's tip and tilt axes.

6. The momentum-balance mechanism of claim 3, wherein the means for supporting the momentum-balance plate and the means for supporting the mirror can tip and tilt in opposite directions without contacting each other.

7. A mounting mechanism for a mirror having tip and tilt axes for permitting rapid dithering of the mirror around the mirror's tip and tilt axes without imparting reaction forces in the mirror's mounting mechanism, the mounting mechanism being comprised of:

a. a platform;
   b. a pair of concentric tripods, each of said tripods having three legs, which are fastened to said platform;
   c. a first interface fitting supported above said platform by a first one of said pair of said tripods and a second interface fitting supported above said platform by the second one of said pair of said tripods;
   d. a balance plate spaced apart from the mirror, said balance plate having a base with an aperture, said balance plate being supported above said platform by said first interface fitting and the mirror being supported above the base of said balance plate by said second interface fitting, said second interface fitting having members which reach past said first interface fitting to support the mirror above said balance plate and which permit the mirror to rotate about the mirror's tip and tilt axes without contacting said balance plate;

whereby the mirror and said balance plate are supported respectively by said second interface fitting and said first interface fitting such that the mirror and said balance plate may rotate about a common center to eliminate reaction forces produced by rotation of said balance plate and the mirror.

8. The mounting mechanism of claim 7, wherein said balance plate includes means for producing rotation of the mirror about the mirror's tip and tilt axes.

9. The mounting mechanism of claim 7, wherein said second interface fitting is comprised of three arms and said first interface fitting contains three apertures through which said three arms can reach while supporting the mirror.

10. The mounting mechanism of claim 9, wherein each arm of said second interface fitting is spaced 120° apart from the adjacent arms.

* * * * *